UNITED STATES PATENT OFFICE.

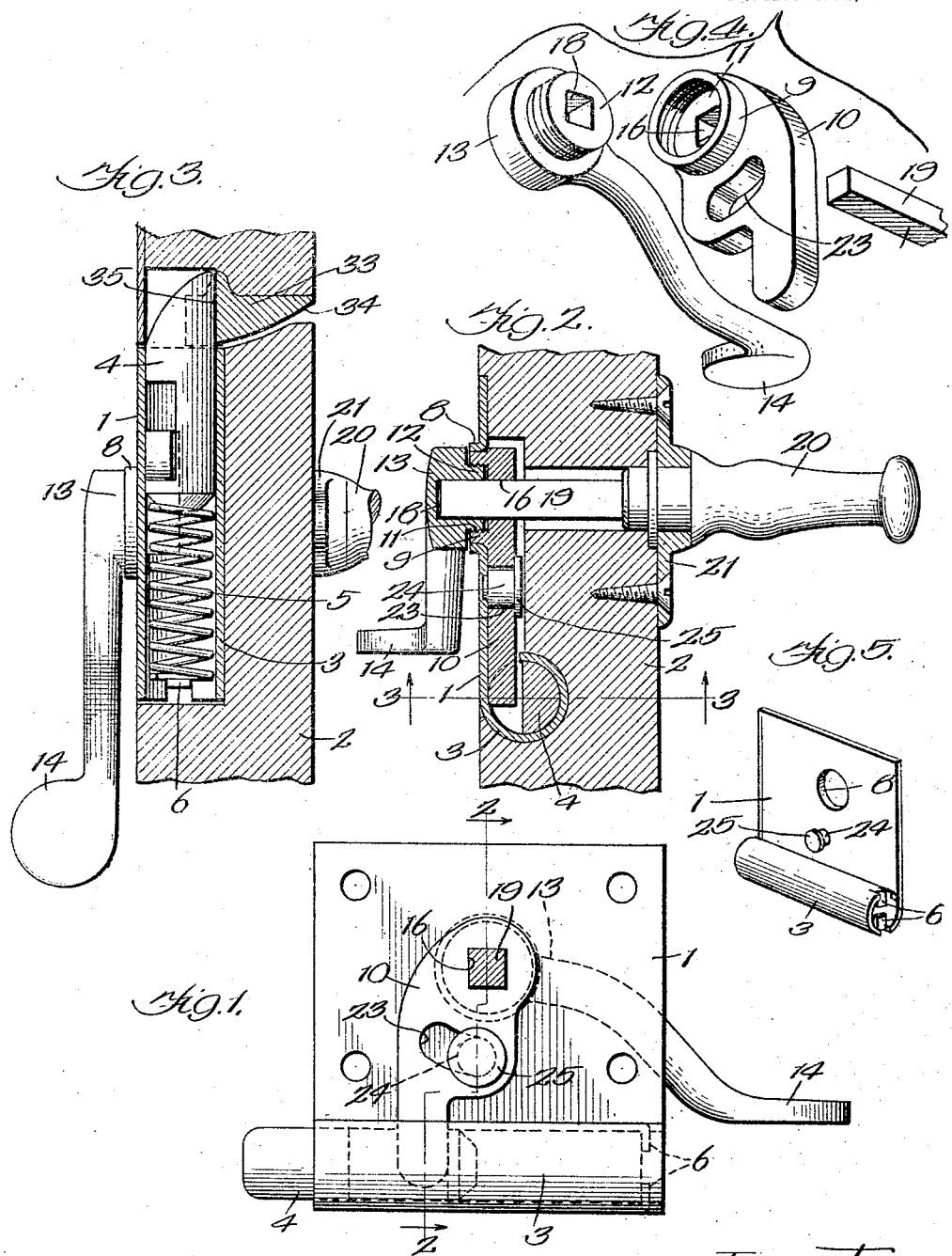

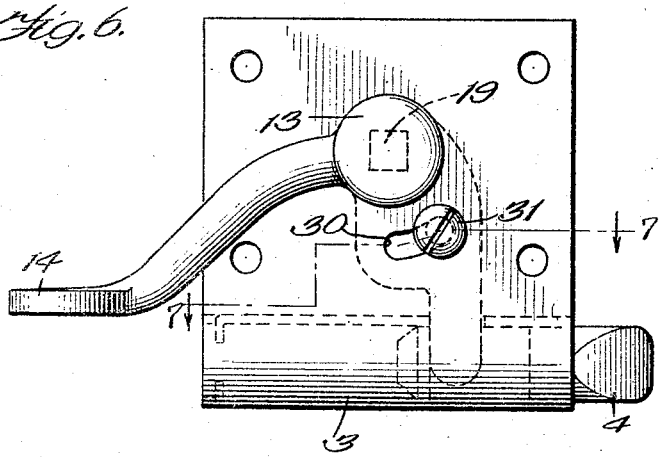
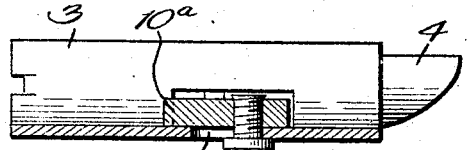
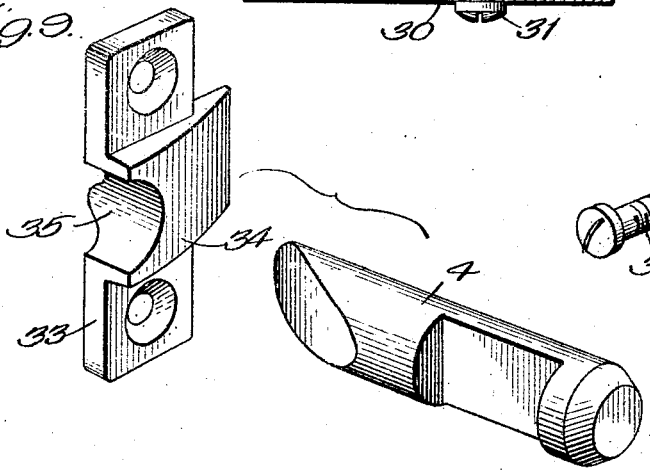
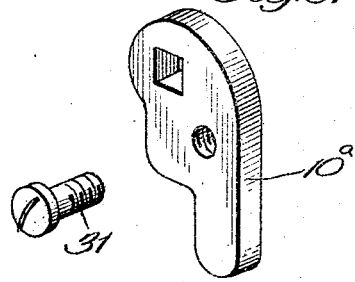

WILLIAM H. APPLEBY, OF CHICAGO, ILLINOIS.

LOCK-FITTING.

1,304,245.  Specification of Letters Patent.  Patented May 20, 1919.

Application filed January 2, 1919. Serial No. 269,375.

*To all whom it may concern:*

Be it known that I, WILLIAM H. APPLEBY, a citizen of the United States, residing at Chicago, in the county of Cook and State of Illinois, have invented a certain new and useful Improvement in Lock-Fittings, of which the following is a specification.

My invention relates to locks, including those intended for doors of automobiles. The object of the invention is to provide a lock which will not rattle, also one in which the lever handle may be made to extend in any desired direction. It is also my purpose to provide a lock of very simple construction and in which the parts may be easily fabricated and be comparatively few in number. In carrying out my invention I operate the bolt by means of an operatable or swinging arm which in turn is operated by a hand lever, the two parts screwing together upon an axis coincident with the axis of rotation of the arm. Ordinarily, when two parts screw together they become tight or reach the "home" position when reaching a definite angular position with reference to each other. Under ordinary conditions of manufacture it is impossible to so form the threads that when the parts are thus screwed "home" they will stop at any definite position. This would be a fatal objection from a practical standpoint in a lock where the lever handle must occupy a definite position when at rest. In auto locks, for example, the custom requires that the handle lie normally in a horizontal position. In any event, the handle should occupy a definite position, either horizontal or vertical, for obviously, it would be bad practice to have the handle come to rest or arrive at "home" position at any chance angle. Nevertheless, the advantage of screwing the lever to the part to which it is to operate is that the connection prevents rattling of the parts whether they are screwed home or not. As a result of my invention it is possible to utilize the advantages of a screw connection and at the same time avoid any of the disadvantages. This I accomplish by screwing the parts together and then locking the hand lever at the desired angle by means of a locking element which in the type illustrated is a square rod, said rod being in the present instance the stem of the handle on the opposite side of the door. Consequently, it is possible to screw the hand lever in far enough to prevent any danger of rattling and to lock it in any one of four different positions.

I accomplish my objects by the mechanism illustrated in the accompanying drawings in which—

Figure 1 is an elevation of the lock viewed from the inner side of the face plate.

Fig. 2 is a sectional elevation of the lock shown in position in the door, the section being taken on the line 2—2, Fig. 1.

Fig. 3 is a bottom plan section taken on the line 3—3, Fig. 2.

Fig. 4 is a perspective view of the hand lever, operating arm, and locking portion of the shank.

Fig. 5 is a perspective view showing the inner side of the face plate.

Fig. 6 is similar to Fig. 1, but shows a modification in the sense that the face plate is slotted instead of the arm.

Fig. 7 is a plan section on the line 7—7, Fig. 6.

Fig. 8 is a perspective view of the arm and stud shown in Figs. 6 and 7.

Fig. 9 is a perspective view of the bolt and striking plate.

Like numerals refer to like parts throughout the several views.

Referring first to the form shown in Figs. 1 to 5, and in Fig. 9, the face plate 1 is designed to be mounted flush with the inside of the door 2. At the lower edge it has a barrel 3 which is integral and forms a guide for the bolt 4. The bolt is backed up by a helical compression spring 5, the spring itself being backed up by tongues 6 upstruck from the metal of the barrel. The formation of the barrel and associated parts is not herein claimed, it being the subject of a separate application filed May 4, 1918, Serial Number 232,490.

The plate 1 has an aperture in the side surrounded by an annular flange 8 which is preferably upstruck from the metal itself and forms a bearing for the boss 9 of the arm 10 which controls the bolt. Said boss has a concentric, internally threaded socket 11 into which screws the externally threaded boss 12 formed upon the hub 13 of the hand lever 14. The parts are shown in perspective in Fig. 4. Concentric with the axis of rotation the arm 10 has a hole 16 and the lever 14 a hole 18. By preference the hole 18 does not extend entirely through the hub of the lever, thus being invisible when the parts are assembled. In the form shown these holes 16 and 18 are square in cross section and adapted to receive the shank 19 of the handle 20, which is located on the opposite side of the door as best shown in Fig. 2. This second handle is journaled in a scutcheon 21 of any suitable design. In the design illustrated the arm 10 contacts the inner surface of face plate 1 and has a slot 23 for accommodating a stud 24 which holds the arm in close contact with the plate. Said stud is riveted to the face plate and has a head 25 which retains the arm in position.

In practice the face plate 1, bolt 4, spring 5, arm 10 and stud 24 constitute the permanently assembled parts of the combination. When the lock is to be mounted in a door, the parts just mentioned are let into it as illustrated in Fig. 2, and elsewhere, and the plate 1 fastened. The hand lever 14 is then screwed into the arm 10 until said lever extends in the direction desired by the user. Ordinarily, it is preferred that the lever occupy the position shown in Fig. 1 in which it extends, in the main, horizontally and will be lifted when it is desired to retract the bolt. When the hand lever has been brought to this position it is locked relatively to the arm 10 by inserting the stem 19 of the handle 20, said stem passing through the hole 16 in arm 10 and into the hole or socket 18 in lever 14. As soon as the stem is thus inserted it prevents further relative rotation between the hand lever and the arm. In other words, the stem serves to lock the hand lever and arm against relative rotation. The scutcheon 21 may then be screwed to the opposite side of the door and the assembly will be complete. If at any time it is desired to have the hand lever extend vertically upward or downward or horizontally in the opposite direction, the stem 19 will be withdrawn far enough to release the hand lever and permit it to be rotated to the desired position. The stem will then be reinserted into the hole or socket 18 and again lock the hand lever to the arm.

From the foregoing it will be seen that it will be impossible for the hand lever to rattle for it is screwed directly into the arm 10 and the friction of the threads will hold the parts firmly whether the lever is screwed "home" or not. Then when the parts are locked together by the shank 19 the connection is most secured because rotation of the hand lever relatively to the arm is effectively prevented. It will also be observed that the parts are few in number, of simple form and present a neat appearance.

In Figs. 1 to 5 I have shown a construction in which the arm 10 has a slot 23 for accommodating the pin 24 by which the arm is held in close contact with the face plate 1. This result may be gained in a different manner, however, as shown in Figs. 6, 7 and 8, wherein the face plate itself has a slot 30 for accommodating a screw stud 31 which screws into the arm 10ª. In either event the stud will hold the arm in contact with the inner side of the plate.

In Fig. 9 I have shown a desirable form of striking plate. Its purpose is to give a broad bearing surface for the bolt when the door is locked. In this form the striking plate 33 has a thickened beveled portion 34 thus affording a surface 35 of increased area against which the bolt bears when the door is locked. The advantage in thus thickening the striking plate is that it reduces wear and thus avoids danger of the bolt rattling against the striking plate after the lock has been in service for some time. The striking plates of many of the vehicle locks now in use are thin and placed edge-wise to the bolt. The result is that the constant jar of the vehicle tends to cause the bolt to enlarge its berth by either wearing away some of the metal or upsetting it. This permits the door to rattle and the berth or seat of the bolt upon the striking plate still further increases. By providing a large bearing surface as I have done this enlargement is prevented and consequently the danger of rattling is avoided.

Having thus described my invention what I claim as new and desire to secure by Letters Patent, is:—

1. A lock having a rotatable arm for causing the lock to function, a handle having a screw connection with said arm, and means effective in any one of a plurality of different positions of the handle relatively to the arm for locking the handle and arm against relative rotation.

2. A lock having a rotatable arm for causing the lock to function, a handle having a screw connection with said arm, the axis of the screw being coincident with the axis of rotation of the arm, and means effective in any one of a plurality of different positions of the handle relatively to the arm for locking the handle and arm against relative rotation.

3. A lock having a bolt, a rotatable arm for actuating it, a handle having a screw connection with the arm, the axis of the screw being coincident with the axis of rotation of the arm, and means coincident with the axis of the screw for locking the arm and the handle against relative rotation, said means being adapted to lock the handle to the arm in any one of a plural number of positions of the handle relatively to the arm.

4. A lock having a bolt, a rotatable arm for actuating it, a handle for actuating the arm, the handle and arm having inter-screwing parts for preventing relative movement in an axial direction, and locking means effective in any one of a plurality of positions of the handle relatively to the arm for preventing relative rotary motion thereof.

5. A lock having a bolt, a rotatable arm for actuating it, a handle for actuating the arm, the handle and arm having inter-screwing parts for preventing relative movement in an axial direction, and locking means in any one of a plurality of positions of the handle relatively to the arm for preventing relative rotary motion thereof, said locking means being coincident with the axis of the inter-screwing parts.

6. A lock having a bolt, a rotatable arm for actuating it, a handle for actuating the arm, the handle and arm having inter-screwing parts for preventing relative movement in an axial direction, and locking means in any one of a plurality of positions of the handle relatively to the arm for preventing relative rotary motion thereof, said locking means being coincident with the axis of the inter-screwing parts and having a regular polyangular cross section, the arm and handle having similar polyangular apertures for receiving said locking means.

7. A door lock having a handle and a rotatable arm, one having a threaded socket and the other having a threaded boss screwing into said socket, the axis of rotation of the arm being coincident with the axis of the threaded socket and boss, locking means adapted to hold the handle at any one of a plurality of angles centered at the axis of the said socket and boss, and door locking means controlled by said arm.

8. A door lock having a handle and a rotatable arm, one having a threaded socket and the other having a threaded boss screwing into said socket, the axis of the socket and boss being coincident with the axis of the rotation of the arm, a second handle for the opposite side of the door, said second handle having a stem passing through the arm and into the first handle for locking the latter against rotation relative to the arm, and door locking means controlled by said arm.

9. A door lock having a handle and a rotatable arm, one having a threaded socket and the other having a threaded boss screwing into said socket, the axis of the socket and boss being coincident with the axis of the rotation of the arm, a second handle for the opposite side of the door, said second handle having a stem passing through the arm and into the first handle for locking the latter against rotation relative to the arm, and door locking means controlled by said arm, the stem being square in cross section so as to lock the first handle in any one of four positions.

10. A door lock having a plate adapted to be fastened to a door, an arm journaled in said plate, a handle for operating said arm, the handle and arm having interfitting threaded boss and socket the axes whereof are coincident with the axis of rotation of the arm, a bolt controlled by said arm, and a second handle for the opposite side of the door, said second handle having a shank which is rectangular in cross section and passes through corresponding apertures in the arm and first handle whereby the handles may extend in different directions from their axes of rotation.

11. A door lock having a plate adapted to be fastened to the door, said plate having an aperture with an upstruck annular flange, an arm having a boss journaled in the flange of the plate and rotating in a plane parallel to the plate, a hand lever for operating the arm, the lever and arm having a threaded socket and boss whereby the arm and hand lever are held in proximity, the axes of the socket and boss being coincident with the axis of rotation of the arm, a rectangular element arranged lengthwise of the said axes and passing through suitable apertures in the arm and hand lever for preventing relative rotation thereof and permitting the hand lever to extend in different directions from its axis of rotation, and a door locking element controlled by said arm.

12. A structure as specified in claim 11 in which there is a handle on the side of the door opposite to the hand lever and the said rectangular element forms the shank of said handle.

13. A door lock having a face plate adapted to lie flush with one side of the door, said face plate having an aperture surrounded by an annular upstruck flange extending outward, an arm adjacent and parallel to, the inside of said plate, said arm having a boss extending outward and journaled in said flange, said boss having a screw socket the axis whereof is coincident with the axis of rotation of the arm, a hand lever having a threaded boss screwing into the threaded socket in the arm, said hand lever having an aperture in the form of a rectangular socket, the central axis whereof is coincident with the axis of the threaded boss formed on said hand lever, the socket not extending through to the outside of the hand lever and thus being invisible from the outside, the arm also having a rectangular aperture adapted to register with the aperture in the hand lever, and a rectangular element insertible from the opposite side of the door for locking the handle against rotation relatively to the arm, and permitting the hand lever to extend in different directions from its axis of rotation, and a bolt controlled by said arm.

14. A structure as specified in claim 13 in which there is a handle on the side of the door opposite to the hand lever and said rectangular element forms a shank in said handle.

In witness whereof, I have hereunto subscribed my name.

WILLIAM H. APPLEBY.